US007720587B2

(12) United States Patent
McDonald et al.

(10) Patent No.: US 7,720,587 B2
(45) Date of Patent: May 18, 2010

(54) VARIABLE OPERATION OF VEHICLE TRANSMISSIONS USING ROUGH ROAD SENSING

(75) Inventors: Mike M. McDonald, Macomb, MI (US); William C. Albertson, Clinton Township, MI (US); Keith D. Van Maanen, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/375,457

(22) Filed: Mar. 14, 2006

(65) Prior Publication Data
US 2007/0219698 A1    Sep. 20, 2007

(51) Int. Cl.
*G06F 17/00* (2006.01)
(52) U.S. Cl. .............................. 701/65; 701/51; 701/55; 701/56; 701/67; 701/68; 701/69; 180/337; 180/338; 192/3.51; 74/335
(58) Field of Classification Search ................... 701/65, 701/51, 55–56, 67–69; 74/335; 192/3.51; 180/337–338; 477/97, 115, 902
See application file for complete search history.

(56) References Cited

U.S. PATENT DOCUMENTS

| 4,651,290 | A | * | 3/1987 | Masaki et al. ................. 701/80 |
|---|---|---|---|---|
| 4,753,135 | A | * | 6/1988 | Sotoyama et al. ............. 477/65 |
| 4,827,416 | A | * | 5/1989 | Kawagoe et al. .............. 701/38 |
| 5,168,952 | A | * | 12/1992 | Oono et al. ................. 180/197 |
| 5,311,773 | A | * | 5/1994 | Bradshaw et al. ........ 73/114.04 |
| 5,320,422 | A | * | 6/1994 | Tsuyama et al. ............. 303/141 |
| 5,432,701 | A | * | 7/1995 | Mayer et al. .................. 701/99 |
| 5,444,621 | A | * | 8/1995 | Matsunaga et al. ............ 701/37 |
| 5,540,299 | A | * | 7/1996 | Tohda et al. ................ 180/243 |
| 2003/0216847 | A1 | * | 11/2003 | Bellinger ..................... 701/51 |
| 2004/0035622 | A1 | * | 2/2004 | Ito et al. ..................... 180/197 |
| 2005/0004741 | A1 | * | 1/2005 | Shigeta et al. ................ 701/80 |
| 2005/0065700 | A1 | * | 3/2005 | Kogure ........................ 701/80 |
| 2005/0212225 | A1 | * | 9/2005 | Suzuki et al. ............. 280/5.514 |
| 2006/0136111 | A1 | * | 6/2006 | Robert et al. ................. 701/65 |
| 2007/0095130 | A1 | * | 5/2007 | Assaf et al. ................... 73/104 |
| 2007/0124053 | A1 | * | 5/2007 | Lindskog et al. ............. 701/72 |

OTHER PUBLICATIONS

Defensive Publication entitled, "A Method to Extend DoD Time Using Rough Road Detection", #487059, dated Nov. 30, 2004.

* cited by examiner

*Primary Examiner*—Khoi Tran
*Assistant Examiner*—Nikhil Sriraman

(57) ABSTRACT

A method for variable operation of a vehicle transmission using rough road sensing includes defining a first set of parameters to calibrate the vehicle transmission for a smooth road condition and a second set of parameters to calibrate the vehicle transmission for a rough road condition. The method includes sensing a road condition, generating a road condition signal corresponding to the road condition, and measuring a magnitude of the road condition signal. The method includes switching from the first set of parameters to the second set of parameters to operate the vehicle transmission when the magnitude of the road condition signal exceeds a first predetermined threshold. The method includes switching from the second set of parameters to the first set of parameters to operate the vehicle transmission when the magnitude of the road condition signal is less than a second predetermined threshold that is different than the first predetermined threshold.

11 Claims, 6 Drawing Sheets switch to calibration "B"
when rough road magnitude > 1.75 switch to calibration "A"
when rough road magnitude < 1.35

VARIABLE OPERATION OF VEHICLE TRANSMISSIONS USING ROUGH ROAD SENSING

FIELD OF THE INVENTION

The present invention relates to transmission control systems, and more particularly to variable operation of vehicle transmissions using rough road sensing.

BACKGROUND OF THE INVENTION

Calibrating a vehicle transmission optimizes ride comfort, performance, and fuel efficiency of a vehicle. Calibration of an automatic transmission of a vehicle requires adjusting parameters such as gear shift times, shift schedules, etc., of the transmission to achieve smooth transmission operation, fuel efficiency etc. Generally, during normal driving conditions, a transmission is calibrated with emphasis on smooth transmission operation to enhance ride comfort. Often, fuel efficiency is sacrificed to achieve smooth transmission operation.

On rough roads, however, the magnitude of vibrations experienced by a vehicle occupant due to the roughness of the road can be significantly higher than the magnitude of vibrations caused by a transmission that is calibrated for optimum fuel efficiency. Therefore, when the road conditions are rough, the emphasis on smooth transmission operation in calibrating a transmission is less important.

SUMMARY OF THE INVENTION

Accordingly, the present invention provides a method for variable operation of a vehicle transmission using rough road sensing. The method comprises defining a first set of parameters to calibrate the vehicle transmission for a smooth road condition and a second set of parameters to calibrate the vehicle transmission for a rough road condition. The method further comprises sensing a road condition and generating a road condition signal corresponding to the road condition, measuring a magnitude of the road condition signal, switching from the first set of parameters to the second set of parameters to operate the vehicle transmission when the magnitude of the road condition signal exceeds a first predetermined threshold, and switching from the second set of parameters to the first set of parameters to operate the vehicle transmission when the magnitude of the road condition signal is less than a second predetermined threshold that is different than the first predetermined threshold.

In another feature, the method comprises determining whether a transmission is operating using one of the first set of parameters and the second set of parameters.

In another feature, the method comprises comparing the magnitude of the road condition signal to one of the first predetermined threshold and the second predetermined threshold.

In still another feature, the method comprises determining whether the magnitude of the road condition signal exceeds the first predetermined threshold.

In still another feature, the method comprises determining whether the magnitude of the road condition signal is less than the second predetermined threshold.

In another feature, the method comprises operating the vehicle transmission using one of the first set of parameters and the second set of parameters.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
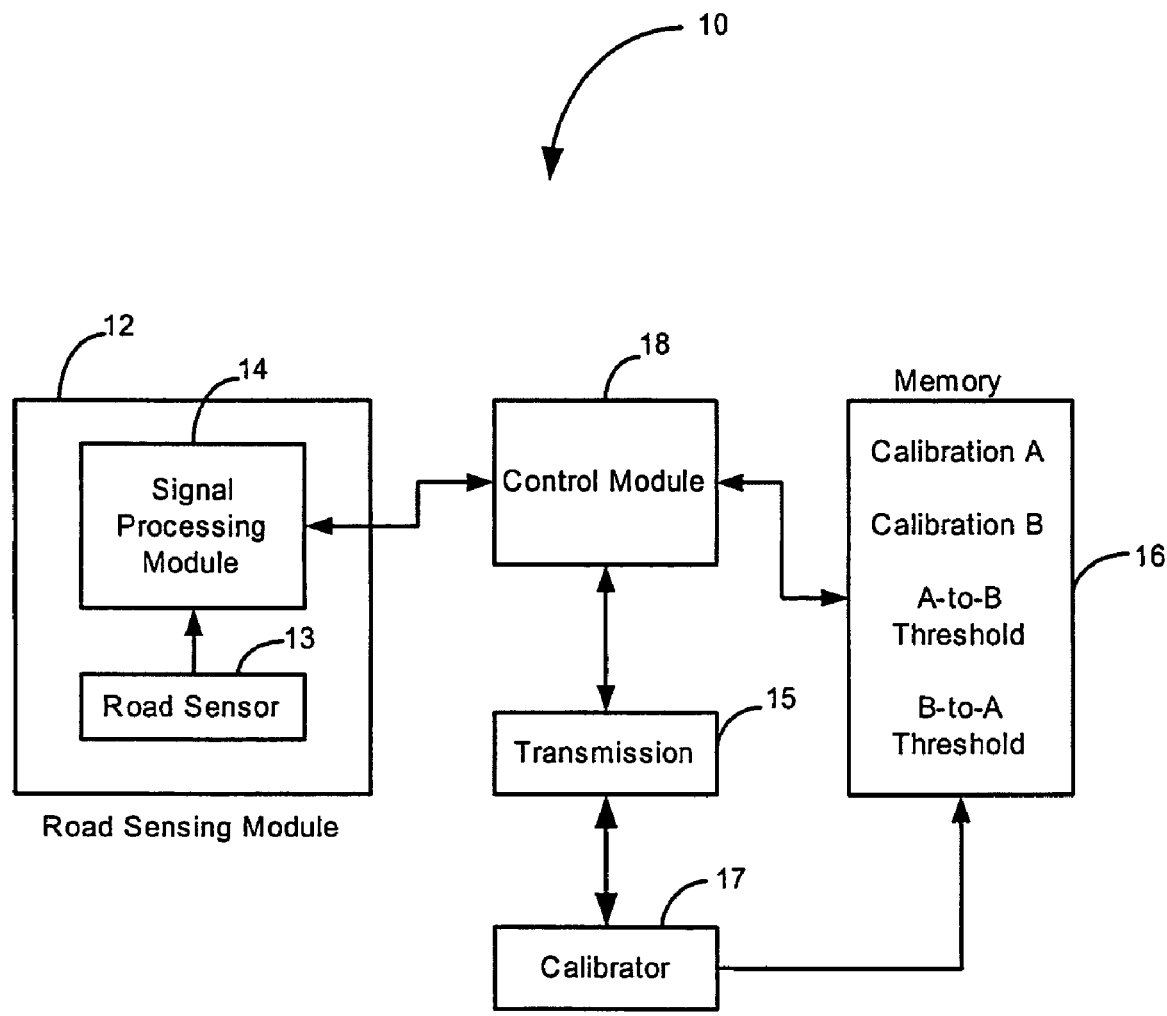
FIG. 1 is a functional block diagram illustrating an exemplary control system for variable operation of a vehicle transmission according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and other suitable components that provide the described functionality.

Referring now to FIG. 1, a system 10 for variable operation of a vehicle transmission using rough road sensing is shown. A road sensing module 12 uses a road sensor 13, such as a sensor used in an anti-lock braking system, to detect a road condition and generate a rough road signal, and a signal processing module 14 that measures the magnitude of the rough road signal. The rough road signal magnitude (RRSM) indicates whether the road is smooth or rough.

Alternately, the road sensing module 12 can use a capacitive-based sensor (not shown) that can be mounted on the chassis, under the hood, or in the interior of a vehicle. Notably, this sensor may have an integral signal conditioning module incorporated in the sensor and therefore may not need an additional signal processing module. This sensor provides a linear output voltage that is directly proportional to acceleration input and accurately indicates whether a road is smooth or rough.

Using another approach, the road sensing module 12 may comprise the road sensor 13 that provides a rough road signal and may not include the signal processing module 14 that measures the magnitude of the rough road signal. In that case, a control module 18 comprises the signal processing module 14, and the control module 18 measures the magnitude of the rough road signal generated by the road sensor 13.

Using still another approach, the road sensing module 12 may utilize the method of rough road detection disclosed in U.S. patent application Ser. No. 11/234,008, filed on Sep. 23, 2005 that is incorporated herein by reference in its entirety.

Yet another approach to detect rough road condition and generate a rough road signal is disclosed in U.S. patent application Ser. No. 11/263,174, filed on Oct. 13, 2005 that is incorporated herein by reference in its entirety.

At the time of manufacture of a transmission 15, a calibrator 17 defines a set A of calibration parameters for smooth road conditions and a set B of calibration parameters for rough road conditions. The calibration parameters control the functions of the transmission 15 such as gear shift schedules, torque converter clutch lockup and release schedules etc. The sets of calibration parameters, generally referred to as calibration sets, are stored in memory 16 in the form of lookup tables.

Additionally, two definable threshold values of the RRSM that determine whether the calibration should be changed when the road condition changes are stored in the memory 16. When a rough road is detected and the RRSM exceeds a first threshold, the calibration parameter set used is changed from calibration set A to calibration set B. Similarly, when a smooth road is detected and the RRSM is less than a second threshold, the calibration parameter set used is changed from calibration set B to calibration set A. The first threshold is generally of a higher magnitude than the magnitude of the second threshold.

Alternately, the control module 18 may comprise the memory 16. Thus, in an alternate configuration of the system 10, the control module 18 may comprise the signal processing module 14 and/or the memory 16.

The control module 18 reads the RRSM measured by the signal processing module 14 and compares the RRSM to the threshold values stored in the memory 16. If a change in operation is necessary, the control module 18 looks up and selects either calibration set A or calibration set B depending on the road condition indicated by the RRSM and controls the transmission 15 using the parameters in the selected calibration set.

Figure 2:
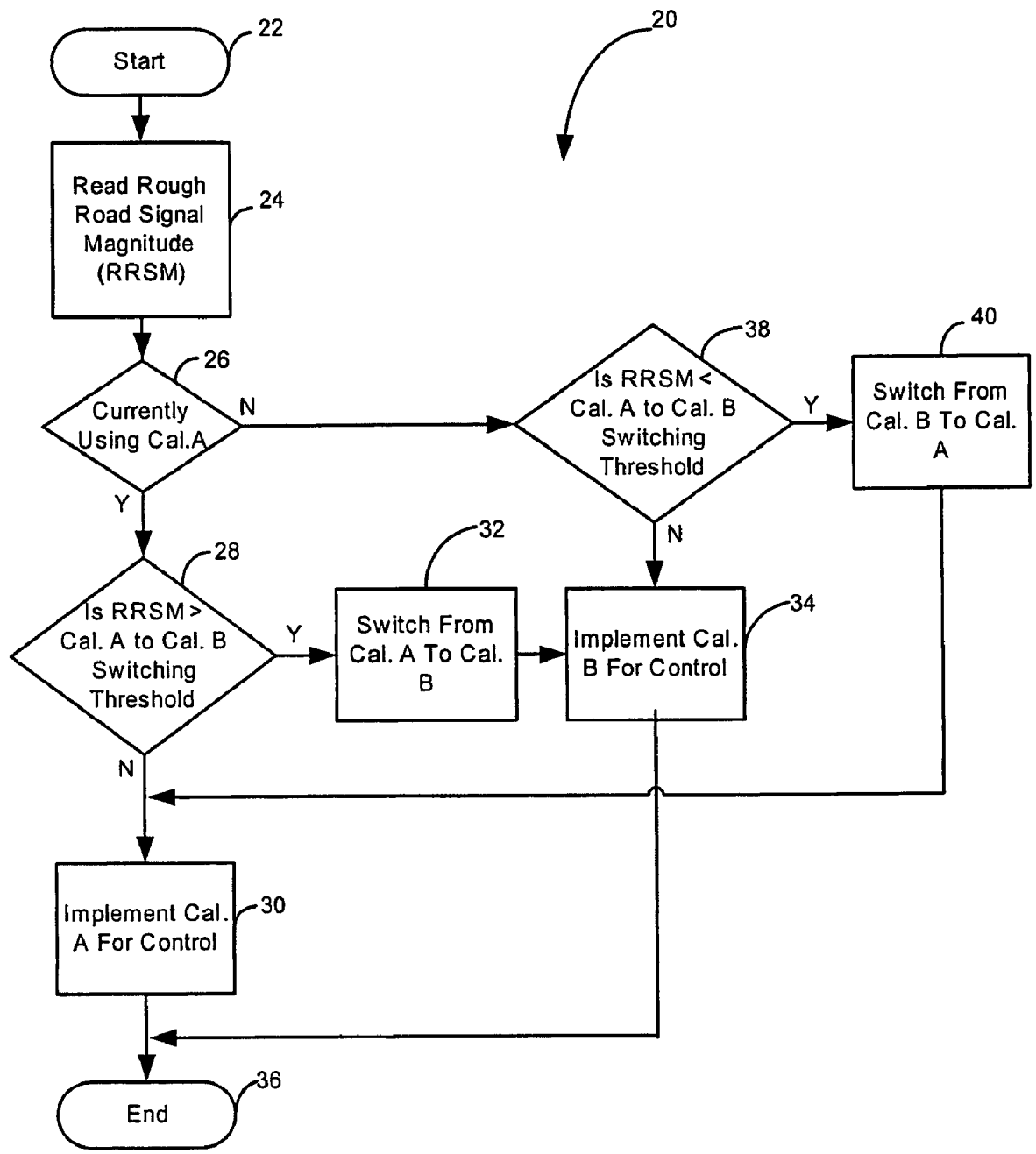
FIG. 2 is a flowchart illustrating an exemplary method for variable operation of a vehicle transmission according to the present invention.

Referring now to FIG. 2, a method 20 for variable operation of a vehicle transmission using rough road sensing is shown. The method 20 utilizes a switching hysteresis algorithm to switch between two sets of calibrations to control the operation of a transmission 15 depending on whether the road condition is smooth or rough. Calibration A denotes a set of calibration parameters or calibration set for smooth road conditions. Calibration B denotes a set of calibration parameters or calibration set for rough road conditions. A first threshold denotes a value of the RRSM that determines whether the calibration set should be changed from A to B. A second threshold that is different than the first threshold denotes a value of the RRSM that determines whether the calibration set should be changed from B to A.

The method 20 begins at step 22. In step 24, a control module 18 reads the rough road signal magnitude (RRSM) determined by the road sensing module 12. In step 26, the control module 18 detects the calibration set being used. If the calibration set in use is calibration A, that is, if the road conditions are smooth, then in step 28, the control module 18 compares the RRSM to the first threshold that is stored in the memory 16 to check if the road condition has changed. If the RRSM is not greater than the first threshold, then the road conditions are still smooth, and in step 30, the control module 18 continues to use calibration set A.

If, however, in step 28, the RRSM is greater than the first threshold, then the road condition has changed from smooth to rough, and in step 32, the control module 18 looks up calibration set B stored in the memory 16 and switches the calibration from calibration set A to calibration set B. The use of calibration set B continues in step 34, and the method 20 ends in step 36.

On the other hand, in step 26, if the calibration in use is calibration B, that is, if the road conditions are rough, then in step 38, the control module 18 compares the RRSM to the second threshold that is stored in the memory 16 to check if the road condition has changed. If the RRSM is less than the second threshold, then the road condition has changed from rough to smooth, and in step 40, the control module 18 looks up calibration set A in the memory 16 and switches the calibration from calibration set B to calibration set A. Then, in step 30, the use of calibration set A continues, and the method 20 ends in step 36. If, however, in step 38, the RRSM is not less than the second threshold, then the road conditions are still rough, and in step 34, the use of calibration set B continues, and the method 20 ends in step 36.

Figure 3:
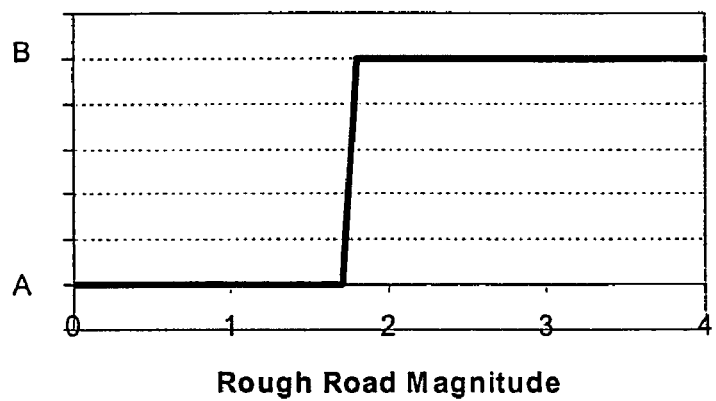
FIG. 3 illustrates an exemplary switching of calibration parameters according to the present invention when the road condition changes from smooth to rough.
Figure 4:
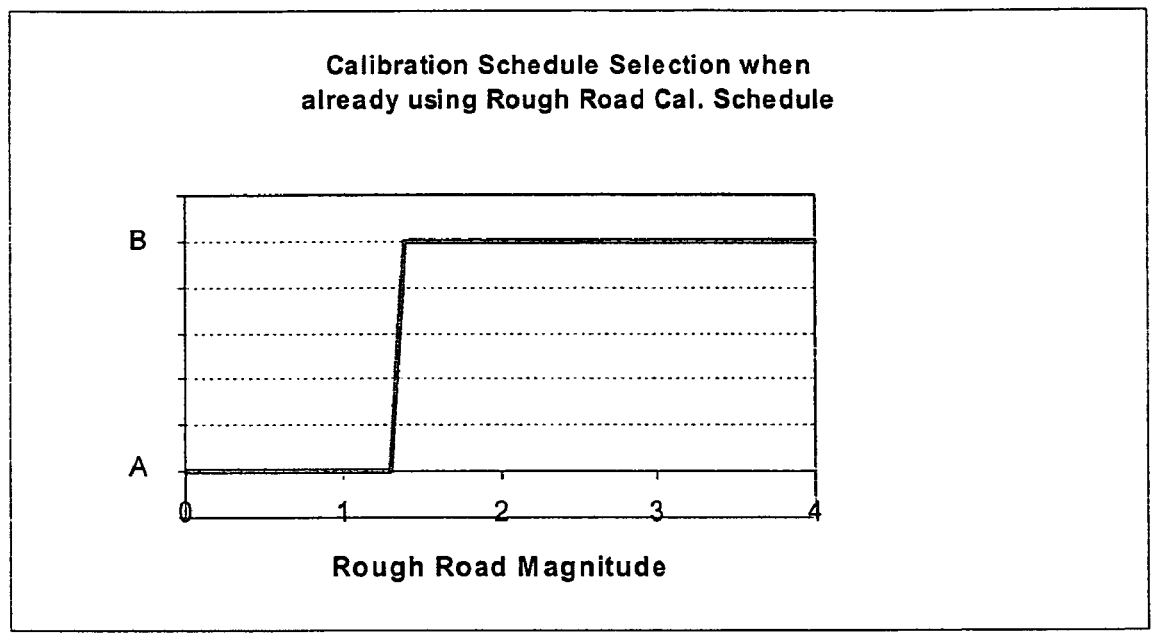
FIG. 4 illustrates an exemplary switching of calibration parameters according to the present invention when the road condition changes from rough to smooth.

The operation of the switching hysteresis algorithm is further illustrated by examples shown in FIG. 3 and FIG. 4. FIG. 3 shows a change in calibration from calibration set A to calibration set B when the road condition changes from smooth to rough and the RRSM exceeds a sample threshold magnitude of 1.75. FIG. 4 shows a change in calibration from calibration set B to calibration set A when the road condition changes from rough to smooth and the RRSM falls below a sample threshold magnitude of 1.35.

Figure 5:
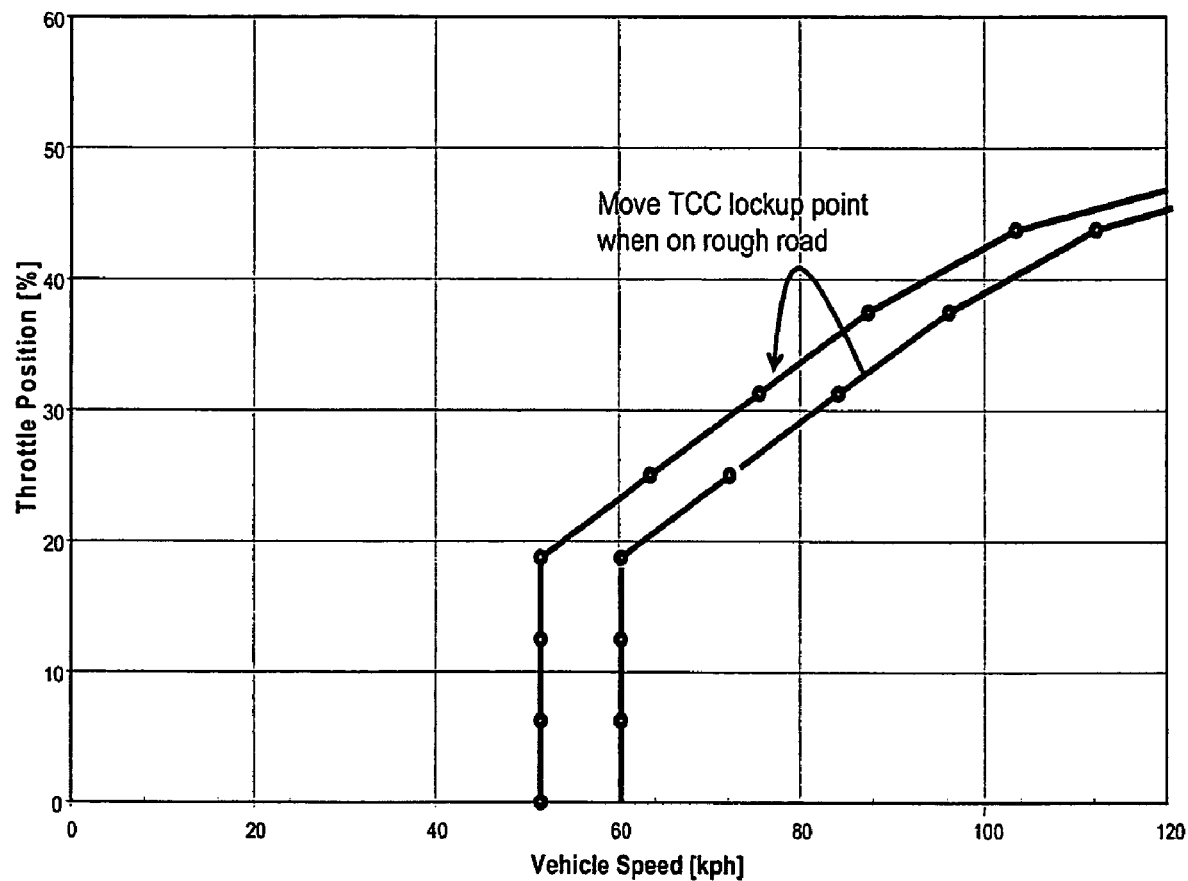
FIG. 5 illustrates an exemplary calibration parameter change for a torque converter clutch lockup schedule according to the present invention when rough road conditions are detected.
Figure 6:
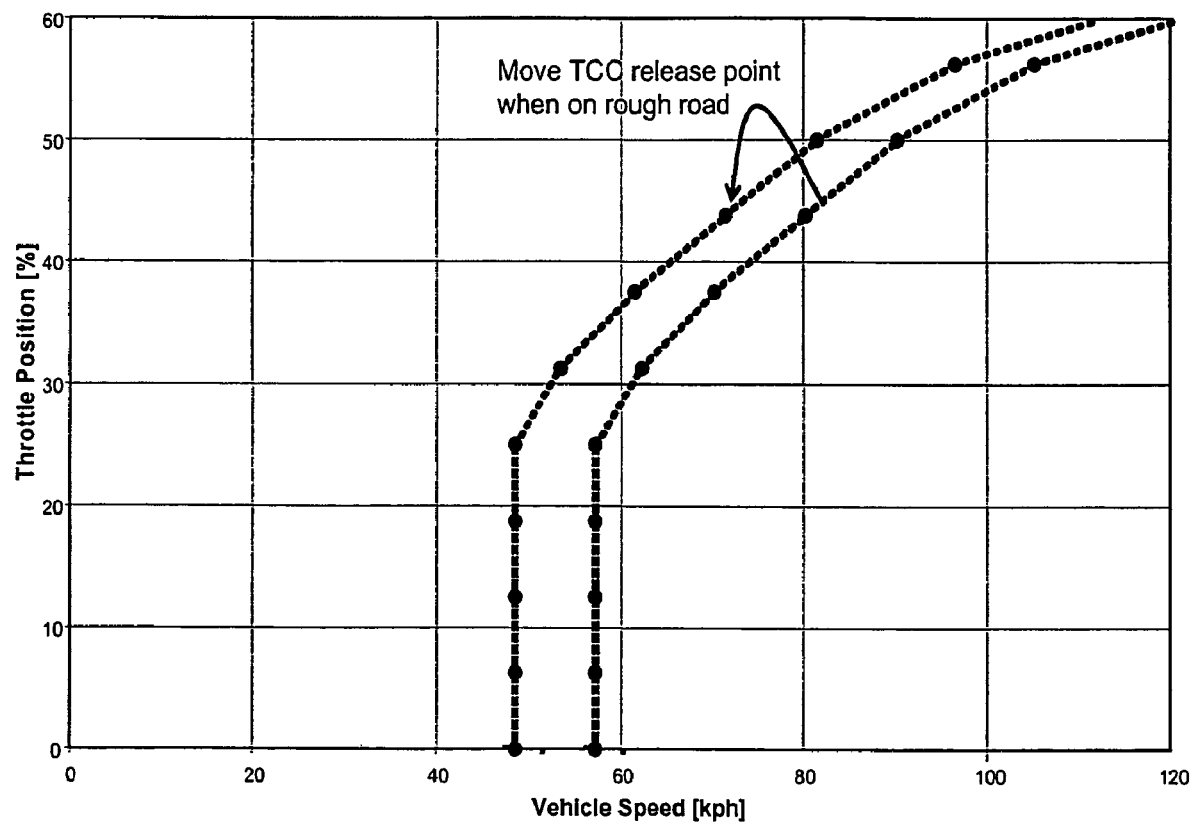
FIG. 6 illustrates an exemplary calibration parameter change for a torque converter clutch release schedule according to the present invention when rough road conditions are detected.

Furthermore, FIG. 5 illustrates an exemplary calibration set change for a torque converter clutch lockup schedule for a fourth gear of a transmission according to the present invention when rough road conditions are detected. FIG. 6 illustrates an exemplary calibration change for a torque converter clutch release schedule for a fourth gear of a transmission according to the present invention when rough road conditions are detected.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. A system for variable calibration of a vehicle transmission using rough road sensing, comprising:

computer readable memory that stores a first set of parameters to calibrate the vehicle transmission for a smooth road condition and a second set of parameters to calibrate the vehicle transmission for a rough road condition;

a road sensing module that comprises a road sensor that senses a road roughness and generates a road condition signal based on the roughness;

a signal processing module that measures a magnitude of the road condition signal; and a control module that switches from the first set of parameters to the second set of parameters when the magnitude of the road condition signal exceeds a first predetermined threshold and from the second set of parameters to the first set of parameters when the magnitude of the road condition signal is less than a second predetermined threshold that is different than the first predetermined threshold, wherein the first set of parameters includes a first gear shift schedule associated with shifting the vehicle transmission to achieve a first fuel consumption rate and the second set of parameters includes a second gear shift schedule associated with shifting the vehicle transmission to achieve a second fuel consumption rate and the first fuel consumption rate is greater than the second fuel consumption rate.

2. The system of claim 1 wherein said control module comprises at least one of said computer readable memory and said signal processing module.

3. The system of claim 1 wherein the control module determines whether the vehicle transmission is calibrated using one of the first and the second sets of parameters.

4. The system of claim 1 wherein the control module compares the magnitude of the road condition signal to one of the first and the second predetermined thresholds stored in the computer readable memory.

5. The system of claim 1 wherein the control module determines whether the magnitude of the road condition signal exceeds the first predetermined threshold.

6. The system of claim 1 wherein the control module determines whether the magnitude of the road condition signal is less than the second predetermined threshold.

7. The system of claim 1 wherein the control module calibrates the vehicle transmission using one of the first and the second sets of parameters.

8. A transmission calibration system for a vehicle, comprising:
   a road sensor that senses a road roughness and that generates a road condition signal based on said road roughness;
   a signal processing module that measures a magnitude of said road condition signal; and
   a control module that selects one of a first set and a second set of parameters based on said magnitude of said road condition signal and that calibrates a vehicle transmission based on said one of said first and second sets of parameters,
   wherein said control module switches from selecting said first set to selecting said second set when said magnitude exceeds a first predetermined threshold and switches from selecting said second set to selecting said first set when said magnitude falls below a second predetermined threshold that is different than said first predetermined threshold, and
   wherein said first and second sets of parameters each include a gear shift parameter, a torque converter lockup parameter, and a torque converter release parameter.

9. The transmission calibration system of claim 8 wherein said first set of parameters is associated with shifting said vehicle transmission based on a first fuel consumption rate and said second set of parameters is associated with shifting said vehicle transmission based on a second fuel consumption rate that is less than said first fuel consumption rate.

10. The transmission calibration system of claim 8 wherein said first set of parameters corresponds to a smooth road condition and said second set of parameters corresponds to a rough road condition.

11. The system of claim 1 wherein said first set of parameters further includes a first torque converter clutch lockup schedule and a first torque converter clutch release schedule, and
   wherein said second set of parameters further includes a second torque converter clutch lockup schedule and a second torque converter clutch release schedule.

* * * * *